United States Patent [19]
Taguchi et al.

[11] Patent Number: 5,211,800
[45] Date of Patent: May 18, 1993

[54] APPLYING APPARATUS

[75] Inventors: Hiroshi Taguchi, Tokyo; Yoji Washizaki, Saitama; Akira Igarashi, Tokyo; Hiroyoshi Nakano, Saitama, all of Japan

[73] Assignee: Somar Corporation, Tokyo, Japan

[21] Appl. No.: 680,893

[22] Filed: Apr. 5, 1991

[30] Foreign Application Priority Data

Apr. 28, 1990 [JP] Japan .................. 2-112157

[51] Int. Cl.⁵ .................. B32B 31/18; B32B 31/20
[52] U.S. Cl. .................. 156/521; 156/552; 156/555; 156/556; 156/559
[58] Field of Search .............. 156/555, 556, 559, 566, 156/580, 552, 511, 517, 521

[56] References Cited

U.S. PATENT DOCUMENTS

| | | | |
|---|---|---|---|
| 4,659,419 | 4/1987 | Miyake | 156/522 |
| 4,743,325 | 5/1988 | Miyake | 156/250 |
| 4,842,672 | 6/1989 | Matsuo et al. | 156/497 |
| 4,844,772 | 7/1989 | Sumi et al. | 156/497 |
| 4,964,937 | 10/1990 | Seki | 156/250 |
| 4,983,248 | 1/1991 | Seki | 156/497 |

Primary Examiner—David A. Simmons
Assistant Examiner—J. Sells
Attorney, Agent, or Firm—Sughrue, Mion, Zinn, Macpeak & Seas

[57] ABSTRACT

An applying apparatus, which cuts off a portion of a plurality of continuous films to a prescribed length and applies the cut-off portions of the films to a base plate, includes film feed members for feeding the continuous films to the base plate. The film feed members are provided above and below a base plate conveyance passage. A film feed member moving device moves the film feed members up and down synchronously at the right and left ends thereof relative to the base plate.

8 Claims, 9 Drawing Sheets

FIG. 9

APPLYING APPARATUS

The present invention relates to an applying apparatus, particularly to an applying apparatus by which stratified films, each consisting of a photosensitive resin layer and a light-transmissible resin film, are applied by heat and pressure to a base plate for a printed circuit board.

BACKGROUND OF THE INVENTION

In conventional applying apparatus for applying continuous stratified films to a base plate for a printed circuit board, support plates for upper and lower film feed members, which are main vacuum suction plates, are coupled thereto with straight movement guide rails and coupled to the body of the apparatus by a rack-and-pinion arrangement so that the film feed members are synchronized together in the mutual opening and closing movement (i.e., moving toward or away from each other) thereof. The upper and lower film feed members are fitted on the straight movement guide rails on the support plates so that the film feed members are moved toward each other to feed the continuous stratified films from film rollers to the applying section of the apparatus, and then moved away from each other. A system relating to the film feed members is disclosed in the Japanese Patent Application (OPI No. 117488/88 (the term "OPI" as used herein means an "unexamined published application").

In the conventional system mentioned above, the straight movement guide rails are disposed at both ends of the film feed members and the support plates, and moving forces are applied to the central portions of the film feed members. However, the right and left portions of each of the film feed members and the support plates are not precisely synchronized with each other during the movement thereof. Hence, if the width of the continuous stratified films is large, the films are wrinkled when being applied under heat and pressure to the base plate. This is a problem.

Also, in the case where the films are simultaneously laminated on both sides of the base plate, it is necessary to provide a complicated synchronism mechanism for synchronizing the supply operations of the upper and lower film supplying devices. In the case where the operations of the upper and lower film supplying devices are not well synchronized, wrinkles would be generated in the films.

The present invention was designed to solve this and other problems of the conventional systems. Accordingly, it is an object of the present invention to provide a system in which upper and lower film feed members are moved up and down synchronously together.

It is another object of the present invention to provide a system in which the constitution of a vertical movement synchronization mechanism for upper and lower film feed members is simplified.

It is yet another object of the invention to provide a system in which it is unlikely that air bubbles will be generated between a film and a base plate is unlikely, and that the film will be wrinkled during the application to the base plate.

SUMMARY OF THE INVENTION

An applying apparatus, provided according to the present invention to solve the above-mentioned problem, cuts off continuous films to a prescribed length and applies the cut-off films to a base plate. The applying apparatus includes film feed members for feeding the continuous films to the base plate being provided above and below a base plate conveyance passage; and a film feed member moving means for moving the film feed members up and down synchronously together toward the base plate.

The upper and lower film feed members may be slidably supported at the right and left ends thereof by the body of the applying apparatus.

The film feed member moving means may include synchronous kinematic coupling means, double-shaft torque transmission mechanisms, and a single motive power source. The synchronous kinematic coupling means, provided at the right and left ends of the upper and lower film feed members, moves the film feed members up and down synchronously together. The double-shaft torque transmission mechanisms are connected to the coupling means by gear means. The single motive power source is provided at the inner rotary shaft of a prescribed one of the double-shaft torque transmission mechanisms.

Support plates for the lower film feed member may be secured to the coupling members of the synchronous kinematic coupling means at one end of each of the coupling members, and support plates for the upper film feed member may be connected to a second end of the coupling members by an arrangement of racks and gears.

An inner rotary shaft of a first double rotary shaft means is coupled to the support plates for the upper film feed member by gear means, the inner rotary shaft of a second double rotary shaft means is coupled to the support plates for the lower film feed member by gear means, and the rotary shaft of a drive motor is coupled to the inner rotary shaft of the second double rotary shaft means.

The upper and lower film feed members and their motive power source may be coupled to the outer rotary shafts of the first and second double rotary shaft means by gear means.

Since the applying apparatus according to the present invention includes the film feed member moving means so that the upper and the lower film feed members, provided above and below the base plate conveyance passage, are moved up and down synchronously together at the right and left ends of the film feed members by the film feed member moving means relative to the base plate, the film feed members are precisely synchronized together at the right and left ends thereof in the vertical movement thereof. Additionally, the support plates for the film feed members are precisely synchronized together at the right and left ends thereof in the vertical movement thereof. Hence, the films are unlikely to wrinkle or the like during the heat and pressure application thereof to the base plate, even if the films have a large width.

BRIEF DESCRIPTION OF THE DRAWINGS

The above-mentioned and other objects, features, and advantages of the present invention will be apparent from the description herein and the drawings attached hereto wherein.

DETAILED DESCRIPTION OF THE PREFERRED EMBODIMENT

Hereinbelow, an embodiment of the present invention is described in detail with reference to the drawings attached hereto. Identical elements shown in the drawings are denoted by the same reference symbols therein and not repeatedly described in detail hereinafter.

Figure 3:
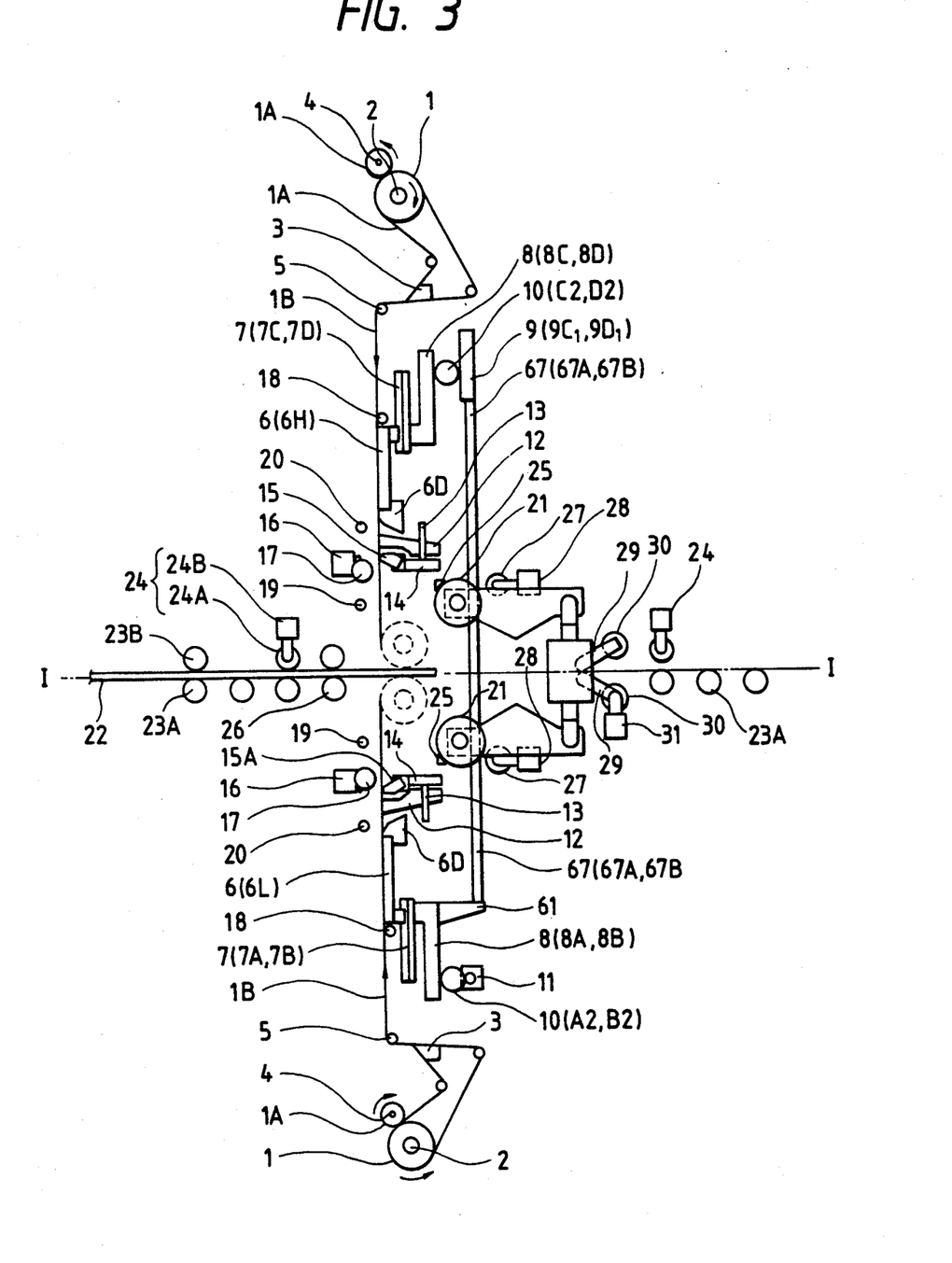
FIG. 3 is a schematic view of the applying apparatus.
Figure 4:
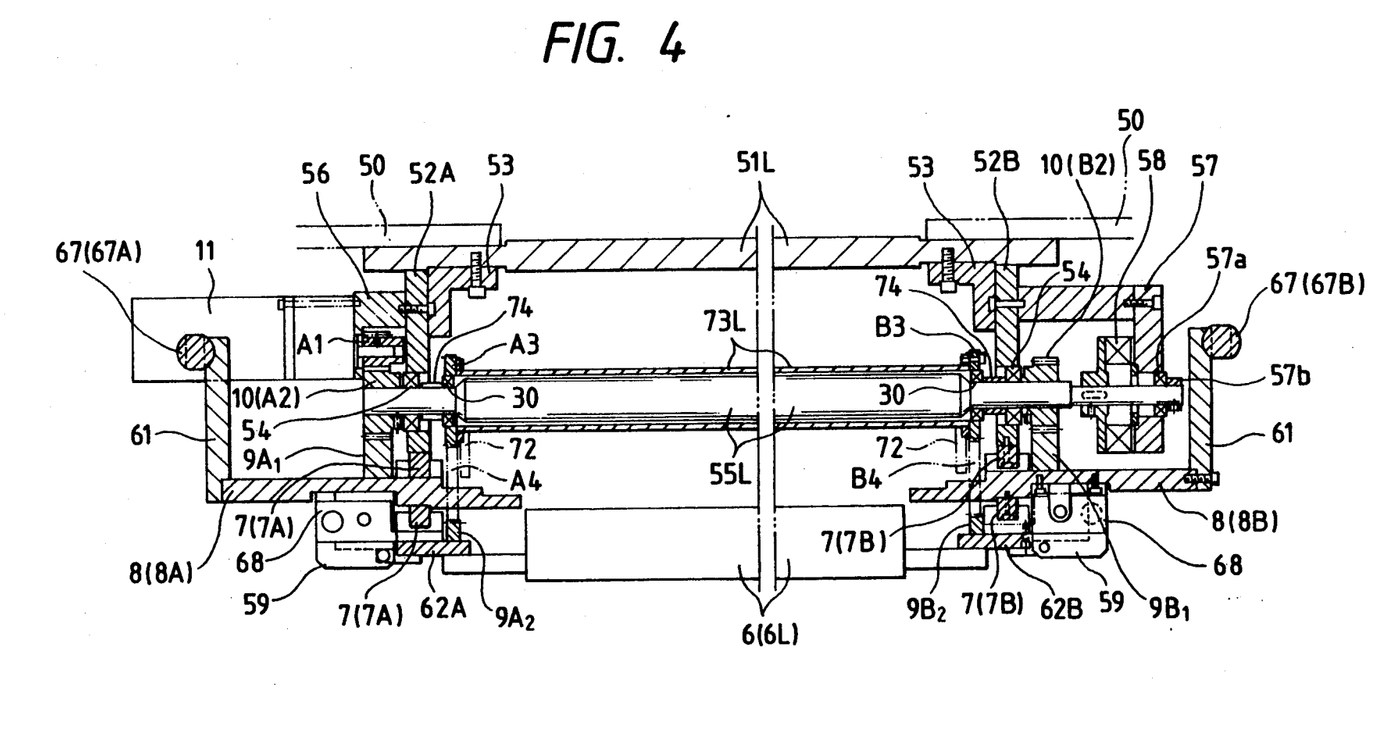
FIG. 4 is a plan view of the lower film feed member section.
Figure 5:
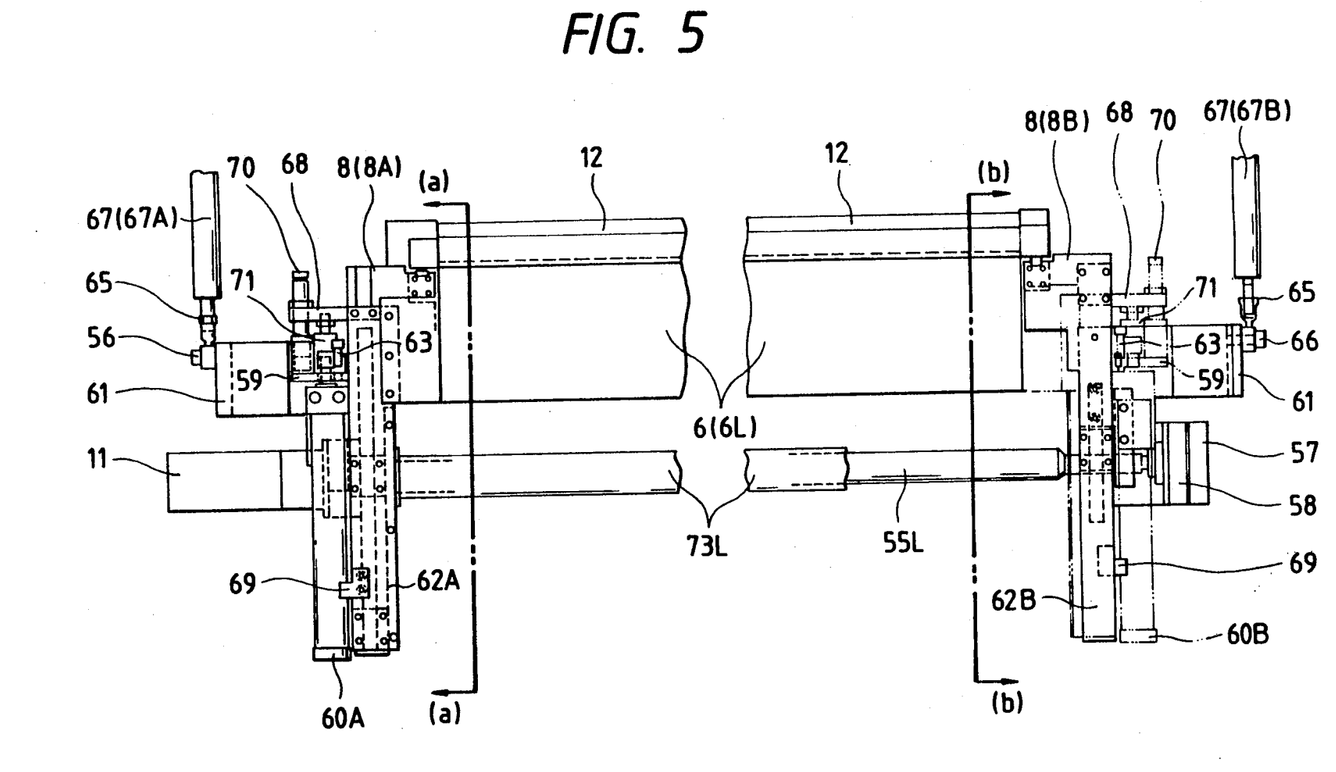
FIG. 5 is a front view of the lower film feed member section.
Figure 6:
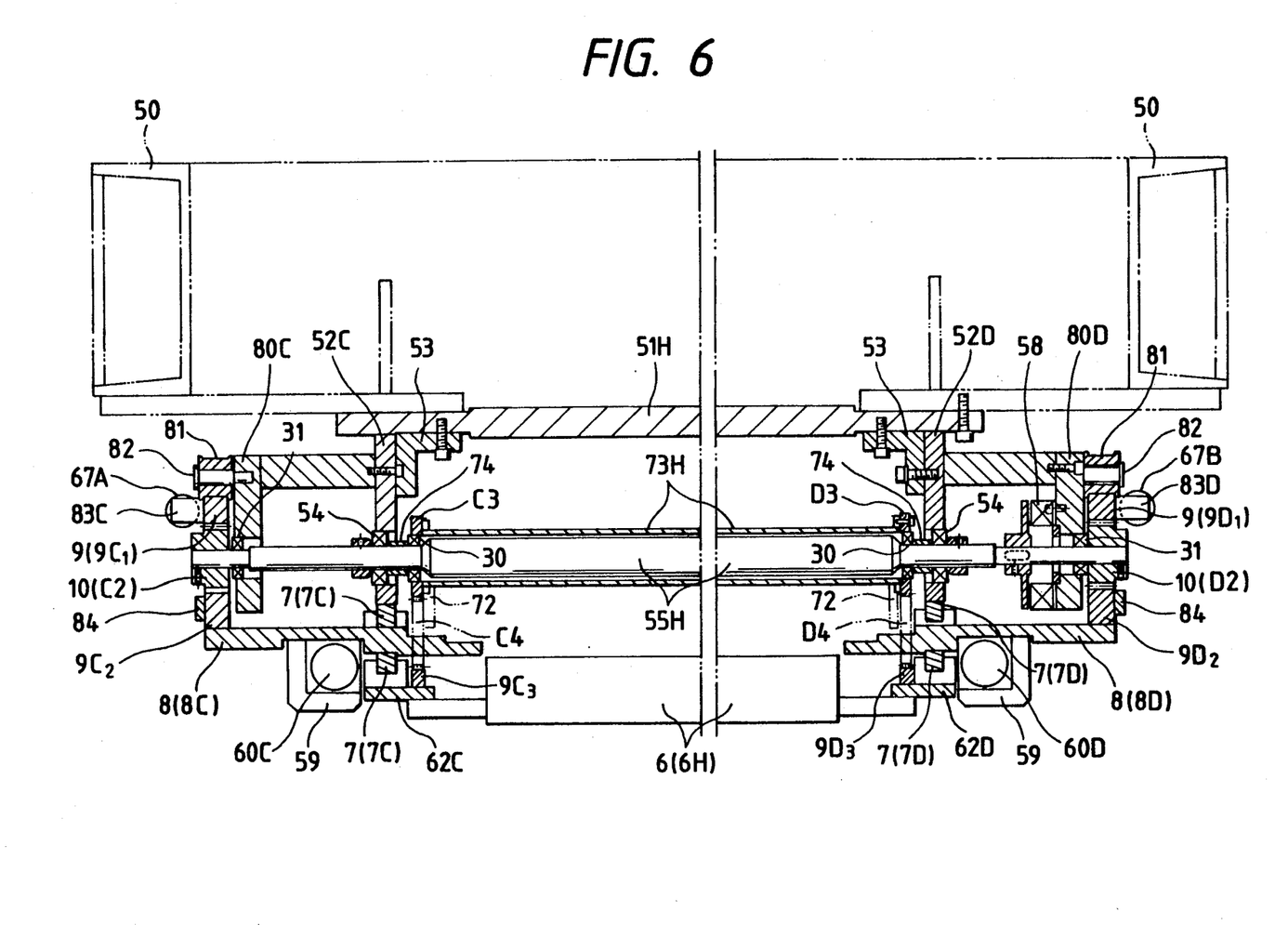
FIG. 6 is a plan view of the upper film feed member section.
Figure 7:
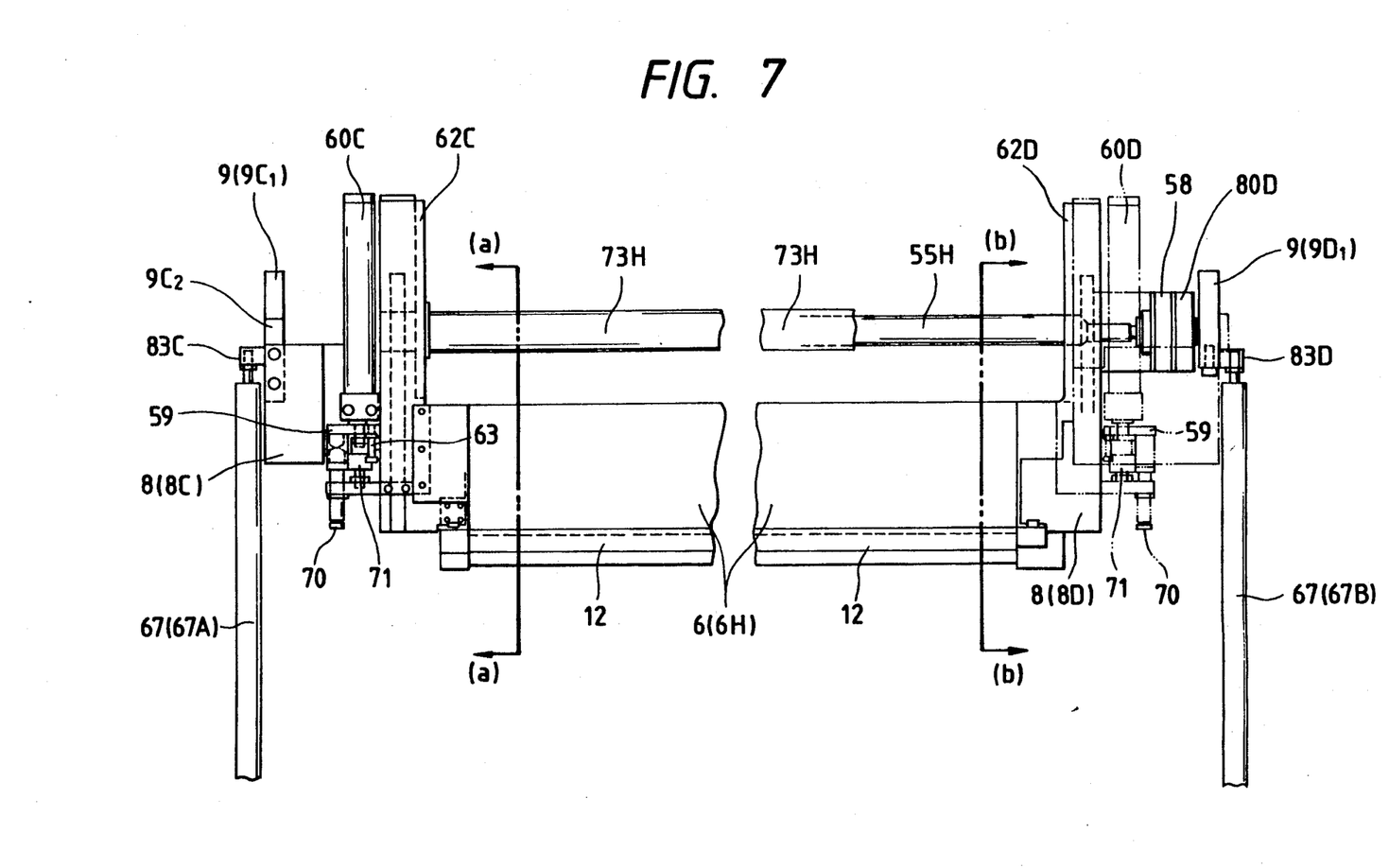
FIG. 7 is a front view of the upper film feed member section.
Figure 8:
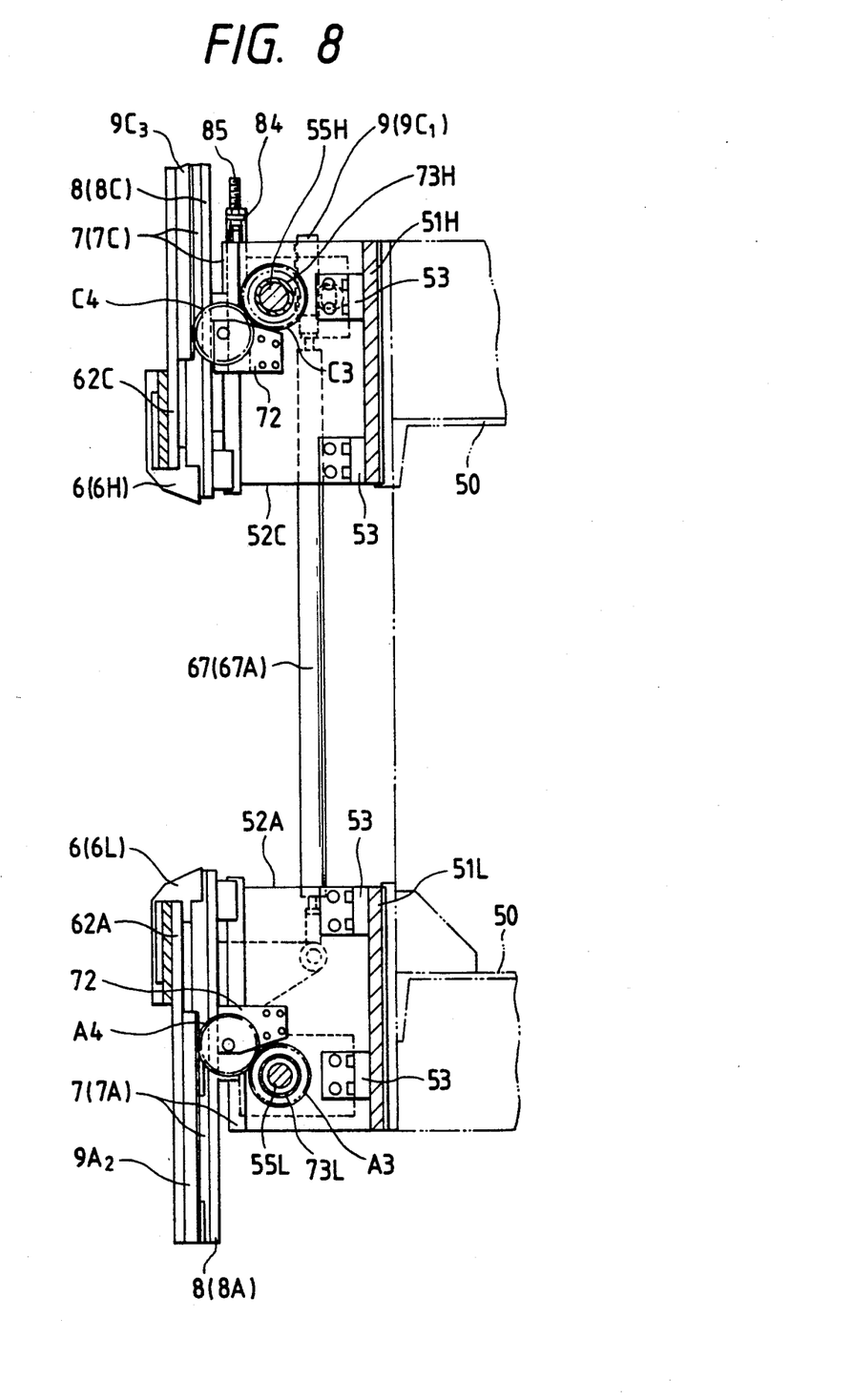
FIG. 8 is a sectional view of the upper and lower film feed member section along a line (a)—(a) shown in FIG. 7.
Figure 9:
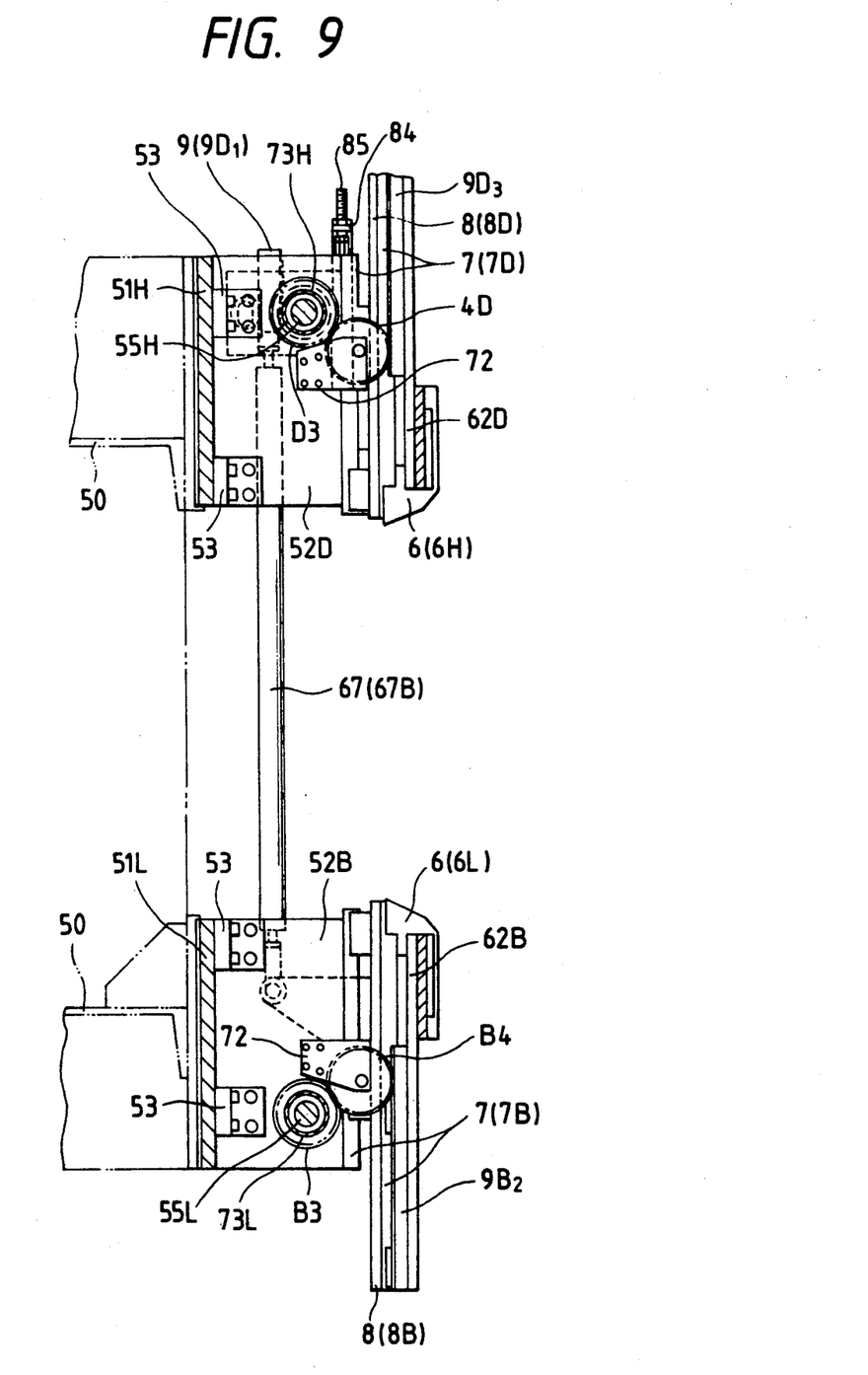
FIG. 9 is a sectional view of the upper and lower film feed member sections along a line (b)—(b) shown in FIG. 7.

Referring to FIG. 3, the applying apparatus of the invention has three-layer stratified films 1, each consisting of a light-transmissible resin film, a photosensitive resin layer and another light-transmissible resin film, being continuously wound on supply rollers 2 in advance. The stratified film 1 from each of the supply rollers 2 is separated by a film separation member 3 into a light-transmissible resin film 1A, which functions as a protective film, and a stratified film 1B consisting of the other light-transmissible resin film and the photo-sensitive resin layer exposed on its side, to be applied to a base plate 22. The separate light-transmissible resin film 1A is wound on a winding roller 4. A pair of such winding rollers are provided above and below a base plate conveyance passage I-I as well as the supply rollers 2. The leading edge of the separated stratified film 1B is fed to a main vacuum suction plate 6 (6H or 6L), which is a film feed member, along a tension roller 5. The main vacuum suction plate 6 has a leading end portion 6D. A static electricity eliminator 18 for eliminating static electricity from the main vacuum suction plate 6 is provided adjacent plate 6.

The main vacuum suction plate 6 is vertically moved toward and away from the position where the film 1B is applied to the base plate 22, shown in FIG. 3. The plate 6 is slidably fitted in guide rails 7 (7A and 7B, or 7C and 7D), which are attached to support plates 8 (8A and 8B, or 8C and 8D) for the main vacuum suction plate 6. The support plates 8 are coupled to the body of the applying apparatus by gears 10 (A2 and B2, or C2 and D2) and racks (not shown in the drawings), so that the support plates 8 can be vertically moved. The gears 10 (C2 and D2) are engaged with racks 9 ($9C_1$ and $9D_1$) provided on support plate coupling rods 67 (67A and 67B), which are for the support plates 8 for the upper and the lower main vacuum suction plates 6. Gears 10 are connected to a drive motor 11.

A film holding member 12 for winding the stratified film 1B is slidably fitted on forward and backward guide rails on the support plates 8. A coupling notched member is provided on the film holding member 12. A coupling rod 13 is fitted in the coupling notched member and is attached to a support member 14 which supports a fixed cutting member 15. A rotary cutting member 17 is rotatably supported by a support member 16, and has a cutting edge extending obliquely at a prescribed angle. Air blowoff pipes 19 and 20 for blowing air to the stratified film 1B are provided above and below the support member 16.

FIG. 3 shows heat and pressure applying rollers 21, the base plate 22, driving rollers 23A, driven rollers 23B, base plate holders 24, each including a base plate holding roller and a pneumatic cylinder for vertically moving the roller, vacuum suction bars 25, wetting rollers 26, wiping rollers 27 for wiping the heat and pressure applying rollers, pneumatic cylinders 28 for the wiping rollers, base plate wiping roller kinematic coupling and holding members 29, base plate wiping rollers 30, and pneumatic cylinders 31 for the base plate wiping rollers.

Hereinbelow, the upper and lower main vacuum suction plates 6H, 6L are described with reference to FIGS. 1-9. First, the lower main vacuum suction plate 6L and structure therefor will be described. As shown in FIGS. 1, 4-5, and 8-9, a lower unit mounting plate 51L is secured at the rear thereof to the body 50 of the applying apparatus by screws. Unit support plates 52A and 52B are secured with fastening joints 53 to the unit mounting plate 51L at the left and right ends of the front thereof by screws. The support plates 8 (8A and 8B) for the lower main vacuum suction plate 6L are slidably fitted on the sliding guide rails 7A and 7B secured to the unit support plates 52A and 52B at the front ends thereof by screws. Bearings 54 are fitted in the through holes of the lower portions of the unit support plates 52A and 52B. A coupling rod 55L for coupling the support plates 8A and 8B together is rotatably fitted at the right and left portions of the rod 55L in the bearings 54. A drive motor mounting member 56 is secured to the unit support plate 52A at the left side thereof by screws. The drive motor 11 is secured to the side of the drive motor mounting member 56 by screws, so that the shaft of the motor 11 extends through the through hole of the mounting member 56. The diameter of the through hole is slightly larger than that of the shaft of the drive motor 11, so that the mounting member 56 does not interfere with the shaft. A drive gear A1 is secured to the shaft of the drive motor 11 by screws, and is engaged with the gear 10 (A2) which is for driving the support plates 8 for the main vacuum suction plates 6H and 6L and which is secured to the support plate coupling rod 55L at the left end thereof by screws. The gear A2 is engaged with a rack $9A_1$ opposite the drive gear A1. The rack $9A_1$ is secured to the rear of the support plate 8A by screws.

A brake mounting member 57 is secured to the right side of the unit support plate 52B by screws, and has a through hole in which a bearing 57a is fitted. The support plate coupling rod 55L is rotatably fitted at the right end thereof in the bearing 57a. A shaft stopper 57b is secured by a screw to the right end portion of the coupling rod 55L, which projects from the brake mounting member 57. An electromagnetic brake 58 is secured to the brake mounting member 57 by screws coaxially with the support plate coupling rod 55L. The brake 58 includes a first portion secured to the rod 55L by screws, and a second portion secured to the brake mounting member 57 by the screws. When electricity is applied to the brake 58, the second portion secured to the brake mounting member 57 acts as an electromagnet to brake the coupling rod 55L.

The gear 10 (B2) for driving the support plates 8 for the main vacuum suction plates 6H and 6L is secured to the support plate coupling rod 55L at the right portion thereof by screws, and is engaged with a rack 9B$_1$ secured to the rear of the support plate 8B by screws.

Positioning members 59 are secured to the front central portions of the support plates 8A and 8B by screws. Pneumatic cylinders 60A and 60B for driving the main vacuum suction plate 6L are secured to the support plates 8A and 8B under the positioning members 59 by screws. Coupling rod attaching members 61 are secured at one end each thereof to the left end of support plate 8A and to the right end of support plate 8B by screws. Mounting plates 62A and 62B for mounting the main vacuum suction plate 6L are slidably fitted on the guide rails 7A and 7B secured to the fronts of the support plates 8A and 8B by screws.

The front portions of the positioning members 59 have through tapped holes in which positioning bolts 63 are engaged, so that the bolts are tightened with nuts 64. The rear portions of the positioning members 59 have through tapped holes through which the piston rods of the pneumatic cylinders 60A and 60B extend in a freely movable manner. The support portions of rod end members 65 are secured to the coupling rod attaching member 61 by bolts 66. Left-handed screws, welded to the lower portions of the support plate coupling rods 67 (67A and 67B) for the support plates 8 for the upper and lower main vacuum suction plates 6, are engaged in the left-handed tapped hole portions of the rod end members 65 opposite the support portions thereof, and are tightened with nuts.

Cylinder piston rod attaching members 68 are secured by screws to the upper portions of the rear surfaces of mounting plates 62A and 62B for the main vacuum suction plate 6L. Stoppers 69 are secured by screws to the lower front portions of the mounting plates 62A and 62B. The outer portions of the cylinder piston rod attaching members 68 have through tapped holes into which shock absorbers 70 for the main vacuum suction plate 6L are engaged downwardly, and secured with nuts. The central portions of the attaching members 68 have through tapped holes in which the piston rods of the pneumatic cylinders 60A and 60B are engaged at cylinder piston rod joints 71, and the piston rods are secured with nuts.

Main vacuum suction plate kinematic coupling gears A3 and B3 are rotatably supported with bearings 30 at the left and right ends of the coupling rod 55 for the support plates 8A and 8B. The bearings 30 are fitted in the gears A3 and B3. Intermediate gears A4 and B4 are engaged with the gears A3 and B3, and are attached with bearings to shafts supported by intermediate gear attaching members 72. Intermediate gear A4 is rotatably supported between the attaching member 72 and the unit support plate 52A. Intermediate gear B4 is rotatably supported between the attaching member 72 and the unit support plate 52B. The attaching members 72 are secured to the unit support plates 52A and 52B by screws. The intermediate gears A4 and B4 are engaged with racks 9A$_2$ and 9B$_2$, secured to the right rear portion of the mounting plate 62A for the main vacuum suction plate 6L and to the left rear portion of the mounting plate 62B for the main vacuum suction plate by screws, respectively. The main vacuum suction plate kinematic coupling gears A3 and B3 are secured to a main vacuum suction plate coupling pipe 73L at the left and right ends thereof by screws. Pipe 73L extends coaxially with the support plate coupling rod 55L. The pipe 73L and the rod 55L can be rotated independently of each other because of the bearings 30 fitted in the gears A3 and B3.

Spacer rings 74, which are coaxial with the support plate coupling rod 55L, are provided between bearings 54 fitted in the unit support plates 52A and 52B and the bearings 30 fitted in the main vacuum suction plate kinematic coupling gears A3 and B3, and keep the main vacuum suction plate coupling pipe 73L in a prescribed position between the unit support plates 52A and 52B.

The mounting plates 62A and 62B for mounting the lower main vacuum suction plate 6L are secured thereto at the left and right ends thereof by screws.

Turning now to an upper portion of the applying apparatus and referring to FIGS. 2, 6–7, and 8–9, an upper unit mounting plate 51H is secured at the rear thereof to the body 50 of the applying apparatus. Unit support plates 52C and 52D are secured with fastening joints 53 to the unit mounting plate 51H at the left and right front portions thereof by screws. Support plates 8 (8C and 8D) for the upper main vacuum suction plate 6H are slidably fitted on the sliding guide rails 7 (7C and 7D), secured to the unit support plates 52C and 52D at the front ends thereof by screws. Bearings 54 are fitted in the through holes of the lower portions of the unit support plates 52C and 52D, so that a coupling rod 55H for coupling the support plates 8 (8C and 8D) together is rotatably supported at the left and right ends of the rod with the bearings. Coupling rod support members 80C and 80D are secured to the left side of the unit support plate 52C and the right side of the unit support plate 52D by screws. Coupling rod support members 80C and 80D have through holes in which bearings 31 are fitted, so that the coupling rod 55H is fitted at left and right ends thereof into the bearings.

Support rollers 81 are rotatably supported with roller shafts 82 by the left side of the support member 80C and the right side of the support member 80D. Racks 9C$_1$ and 9D$_1$, secured at their lower ends to coupling rod attaching plates 83C and 83D by screws, are supported by the support rollers 81 opposite the toothed portions of the racks 9C$_1$ and 9D$_1$, so as to guide the racks being vertically moved.

A right-handed screw, welded to the upper end of the support plate coupling rod 67A for the support plates 8A and 8C for the lower and upper main vacuum suction plates 6L, 6H, respectively, is engaged in the coupling rod attaching plate 83C, and is tightened with a nut, so that the support plates 8A and 8C are kinematically coupled together by the coupling rod. A right-handed screw, welded to the upper end of support plate coupling rod 67B for the support plates 8B and 8D for the lower and upper main vacuum suction plates 6L, 6H, respectively, is engaged in the coupling rod attaching plate 83D and is tightened with a nut, so that the support plates 8B and 8D are kinematically coupled together.

The gears 10 (C2 and D2) for driving the support plates 8C and 8D for the upper main vacuum suction plate 6H are engaged with the racks 9C$_1$ and 9D$_1$, and are secured to the support plate coupling rod 55 coaxially therewith at the left and right ends thereof by screws.

An electromagnetic brake 58 is secured to the coupling rod support member 80D, by screws, coaxially with the support plate coupling rod 55H. Brake 58 includes a first portion secured to the coupling rod 55H by screws and a second portion secured to the coupling rod support member 80D by a second set of screws. When electricity is applied to the brake 58, the portion secured to the support member 80D acts as an electromagnet to brake the coupling rod 55H.

The support plate drive gears C2 and D2 are engaged with racks $9C_2$ and $9D_2$ secured by screws to the rear surfaces of the support plates 8C and 8D for the upper main vacuum suction plate 6H. Positioning members 59 are secured to the front central portions of the support plates 8C and 8D by screws. Pneumatic cylinders 8C and 8D for driving the upper main vacuum suction plate 6H are provided over the positioning members 59, and are secured to the support plates 8C and 8D by screws. Mounting plates 62C and 62D for mounting the main vacuum suction plate 6H are slidably fitted on the guide rails 7C and 7D secured to the front surfaces of the support plates 8C and 8D by screws. The front portions of the positioning members 59 have through tapped holes in which positioning bolts 63 are engaged, so that the bolts are tightened with nuts 64 (not shown in the drawings). The rear portions of the positioning members 59 have through tapped holes through which the piston rods of the pneumatic cylinders 60C and 60D extend in a freely movable manner.

A mounting member 84 for a shock absorber 85 for the upper main vacuum suction plate 6H is secured to the left side of the rack $9C_1$ by a screw, and has a through tapped hole into which the shock absorber 85 is engaged downwardly, so that the shock absorber is secured with a nut. A second mounting member 84 for a second shock absorber 85 is secured to the right side of the rack $9D_2$ by screws, and has a through tapped hole into which the shock absorber is engaged downwardly, so that the shock absorber is secured with a nut.

Cylinder piston rod attaching members 68 are secured to the lower portions of the rear surfaces of the mounting plates 62C and 62D for the upper main vacuum suction plate 6H by screws. Stoppers 69 are secured to the upper front portions of the mounting plates 62C and 62D by screws. The outer portions of the attaching members 68 have through tapped holes into which shock absorbers 70 for the main vacuum suction plate 6H are engaged upwardly, so that the shock absorbers are secured with nuts. The central portions of the attaching members 68 have through tapped holes into which cylinders piston rod joints 71 coupled to the piston rods of the pneumatic cylinder 60C and 60D are engaged at the ends of the joints 71, so that the joints 71 are secured with nuts.

Gears C3 and D3 for kinematically coupling the main vacuum suction plate 6H are rotatably supported with bearings 30 at the left and right ends of the support plate coupling rod 55. The bearings 30 are fitted in the gears C3 and D3. Intermediate gears C4 and D4 are engaged with gears C3 and D3, and are attached with bearings to shafts supported by intermediate gear mounting members 72. Intermediate gear C4 is rotatably supported between a first intermediate gear mounting member 72 and a first unit support plate 52C. Intermediate gear D4 is rotatably supported between a second intermediate gear mounting member 72 and a second unit support plate 52D. The mounting members 72 are secured to the unit support plates 52C and 52D by screws. Intermediate gears C4 and D4 are engaged with racks $9C_3$ and $9D_3$ secured by screws to the right rear portion of the first mounting plate 62C for the main vacuum suction plate 6H and the left rear portion of the second mounting plate 62D for suction plate 6H, respectively.

The main vacuum suction plate kinematic coupling gears C3 and D3 are secured to a main vacuum suction plate coupling pipe 73H at the left and right ends thereof by screws. Pipe 73H extends coaxially with the support plate coupling rod 55H, so that the pipe 73H and the rod 55H can be rotated independently of each other, because of bearings 30 fitted in the gears C3 and D3. Spacer rings 74 are provided between bearings 54 fitted in the unit support plates 52C and 52D and the bearings 30 fitted in the gears C3 and D3, and are disposed coaxially with the support plate coupling rod 55H, so that the spacer rings 74 keep the pipe 73H in a prescribed position between the unit support plates 52C and 52D.

Mounting plates 62C and 62D are secured to the upper main vacuum suction plate 6H at the left and right ends thereof by screws.

Hereinbelow, the operation of the applying apparatus and that of the upper and the lower main vacuum suction plates 6H and 6L are described. First, continuous stratified film 1B is manually cut-off at the leading edge portion thereof, so as to have a trued-up leading edge of the film to start the automatic operation of the applying apparatus. Thereafter, the leading edge of the base plate 22 conveyed by a base plate conveyor is detected by a base plate leading edge sensor (not shown in the drawings) provided at the conveyor, so that a detection signal is output from the sensor. The counting of pulses from a rotary encoder (not shown in the drawings) attached to a drive motor (not shown in the drawings) of the base plate conveyor is started by a counter based on receiving the detection signal. When the count of the counter has become a prescribed value, the drive motor of the base plate conveyor is stopped, thereby halting the base plate 22. The film holding member 12 is pulled in based on the detection signal, so that the continuous stratified film 1B is wound on the leading end portion 6D of the main vacuum suction plate 6. After the base plate is halted after the count of the counter has become the prescribed value, a timer (not shown in the drawings) is activated. When the timer has been activated for a set time, the pneumatic cylinders 60A–60D for driving the upper and lower main vacuum suction plates 6H and 6L are activated, so that the main vacuum suction plates, having the leading end portions 6D holding by suction the films 1B wound thereon, are moved toward the halted base plate 22, and thus tentatively apply the films to the base plate 22.

For the tentative applying of the upper film 1B to the base plate 22, the piston rods of the pneumatic cylinders 60C and 60D for driving the upper main vacuum suction plate 6H are protruded. Then, the cylinder piston rod joints 71 attached to the tips of the piston rods of the cylinders 60C and 60D are moved, and the cylinder piston rod attaching members 68 fitted with the joints are pushed down. Mounting plates 62C and 62D having the attaching members 68 secured thereto, also are pushed downwardly toward the base plate 22.

Since the racks $9C_3$ and $9D_3$ are attached to the mounting plates 62C and 62D and are engaged with the intermediate gears C4 and D4 engaged with the main vacuum suction plate kinematic coupling gears C3 and D3 secured to the main vacuum suction plate coupling pipe 73H, the mounting plates 62C and 62D are moved synchronously together while being guided by the slide rails 7C and 7D, so that the right and left ends of the upper main vacuum suction plate 6H, secured at both ends thereof to the mounting plates, are precisely and synchronously moved together. The position at which the upper main vacuum suction plate 6H completes the tentative heat and pressure application of the upper film 1B to the base plate 22 is determined by the positions in which the stoppers 69 secured to the left and right mounting plates 62C and 62D contact the positioning bolts 63 attached to the positioning members 59.

To tentatively apply the lower film 1B to the base plate 22, the piston rods of the pneumatic cylinders 60A and 60B for driving the lower main vacuum suction plate 6L are protruded. Then, the cylinder piston rod joints 71 attached to the piston rods tips of the pneumatic cylinders 60A and 60B are moved, and the cylinder piston rod attaching members 68 fitted with the joints are pushed upwardly, and the mounting plates 62A and 62B, having cylinder piston rod attaching members secured thereto, also are pushed upwardly toward the base plate 22. Since the racks $9A_2$ and $9B_2$ attached to the mounting plates 62A and 62B are engaged with the intermediate gears A4 and B4 (engaged with the main vacuum suction plate kinematic coupling gears A3 and B3 secured to the main vacuum suction plate coupling pipe 73L at the left and right ends thereof), the mounting plates 62A, 62B are moved synchronously together while being guided by the slide rails 7A and 7B, so that the right and left ends of the lower main vacuum suction plate 6L, secured at both ends thereof to the mounting plates 62A, 62B, are moved in precise synchronization together. The tentative application completion position of the continuous stratified film 1B to the base plate 22 by the lower main vacuum suction plate 6L is determined by the positions in which the stoppers 69, secured to the left and right mounting plates 62A and 62B, contact the positioning bolts 63 attached to the positioning members 59.

Limit switches at the pneumatic cylinders 60A–60D are moved so that the vacuum suction of films 1B by the main vacuum suction plates 6H and 6L is ceased. Simultaneously, a timer is activated so that the tentative heat and pressure application of the films 1B to the base plate 22 by the main vacuum suction plates 6H and 6L is performed for a set time of the timer. The pneumatic cylinders 60A–60D performing the film tentative application operation are deactivated based on a signal indicative of the lapse of the set time of the timer. The positions to which the cylinders 60A–60D are shifted as a result of being deactivated (and which correspond to the original position in which the main vacuum suction plates 6H and 6L were in prior to the. tentative application of the films 1B to the base plate 22) are determined by the positions at which the main vacuum suction plate shock absorbers 70, attached to the cylinder piston rod attaching member 68 secured to the mounting plates 62A–62D, contact the positioning members 59.

After the electromagnetic brakes 58, attached to the support plate coupling rods 55H and 55L at the right ends thereof, are de-energized based on a signal indicating the lapse of the set time of the timer, the drive motor 11 begins to rotate clockwise (with regard to being viewed from the tip of the shaft thereof). The torque of motor 11 is transmitted to the drive gear A1 mounted on the motor shaft, so that the support plate drive gear A2 secured to the support plate coupling rod 55L at the left end thereof and engaged with the drive gear A1, is rotated, and the rack $9A_1$, secured to the support plate 8A and engaged with the support plate drive gear A2, is moved away from the base plate conveyance passage I-I. Then, the coupling rod 55L is rotated to transmit torque to the support plate drive gear B2, and the rack $9B_1$, secured to the support plate 8B and engaged with the drive gear B2, is moved away the base plate conveyance passage I-I.

As a result, the support plate 8A (to which the rack $9A_1$ is secured) and the support plate 8B (to which the rack $9B_1$ is secured) are moved synchronously together while being guided by the sliding guide rails 7A and 7B, so as to move away from the base plate conveyance passage I-I. The movement range of the support plates 8A and 8B is determined by two limit switches (not shown in the drawings). The coupling rod attaching plate 83C is moved down synchronously with the movement of the support plate 8A, because the coupling rod attaching members 61 are secured to the support plates 8A and 8B and the support plate coupling rod 67A is secured at a first end thereof with the rod end member 65 to the coupling rod attaching member 61 for the support plate 8A by the bolt 66, and secured at a second end thereof to the coupling rod attaching plate.

The rack $9D_1$, secured to the coupling rod attaching plate 83C, is moved downwardly while being guided by the support roller 81, so that the support plate drive gear D2 engaged with the rack $9D_1$ is rotated clockwise (with regard to being viewed from the right side of the applying apparatus). The support plate coupling rod 55H to which the support plate drive gear D2 is secured also is rotated clockwise (with regard to being viewed from the right side of the apparatus) The rack $9D_2$ engaged with gear D2 is moved up. Since the rack $9D_2$ is secured to the support plate 8D for the upper main vacuum suction plate 6H, the support plate is moved upwardly so as to move away from the base plate conveyance passage I-I.

Thus, the support plates 8A–8D for the lower and upper main suction plates 6L and 6H are all moved synchronously together by the drive motor 11. At that time, the upper and the lower stratified films 1B are applied, under heat and pressure, to the base plate 22 by the upper and lower heat and pressure applying rollers 21. Based on a detection signal output from a base plate trailing edge sensor, a support plate movement counter and a film cut-off position counter (none of which are shown in the drawings) count pulses from a rotary encoder (not shown in drawings) attached to a motor (also not shown in the drawings) for driving the heat and pressure applying rollers 21.

When the count of the support plate movement counter has become a prescribed value, the drive motor 11 starts rotating counterclockwise (with regard to being viewed from the tip of the shaft thereof). The torque of the drive motor 11 is transmitted to the drive gear A1 mounted on the shaft of the motor, so that the support plate drive gear A2 engaged with the drive gear A1 is rotated, and the rack $9A_1$, secured to the support plate 8A and engaged with gear A2, is moved so as to approach the base plate conveyance passage I-I. Thus, since the support plate coupling rod 55L is rotated, the torque thereof is transmitted to the support plate drive gear B2, so that the rack $9B_1$, secured to the support plate 8B and engaged with the support plate drive gear B2, is moved so as to approach the base plate conveyance passage I-I.

As a result, the support plate 8A having rack 9A₁ secured thereto and the support plate 8B having rack 9B₁ secured thereto are moved synchronously together while being guided by the guide rails 7A and 7B, so as to approach the base plate conveyance passage I-I. The movement range of the support plates 8A and 8B is determined by two limit switches (not shown in the drawings). The coupling rod attaching plate 83C is moved upwardly and synchronously with the support plate 8A because the coupling rod attaching members 61 are secured to the support plates 8A and 8B, and because the support plate coupling rod 67A for the upper and lower main vacuum suction plates 6H and 6L is secured at one end by rod end member 65 to the coupling rod attaching member 61 by bolt 66 and is secured at a second end thereof to the coupling rod attaching plate 83C.

Figure 1:
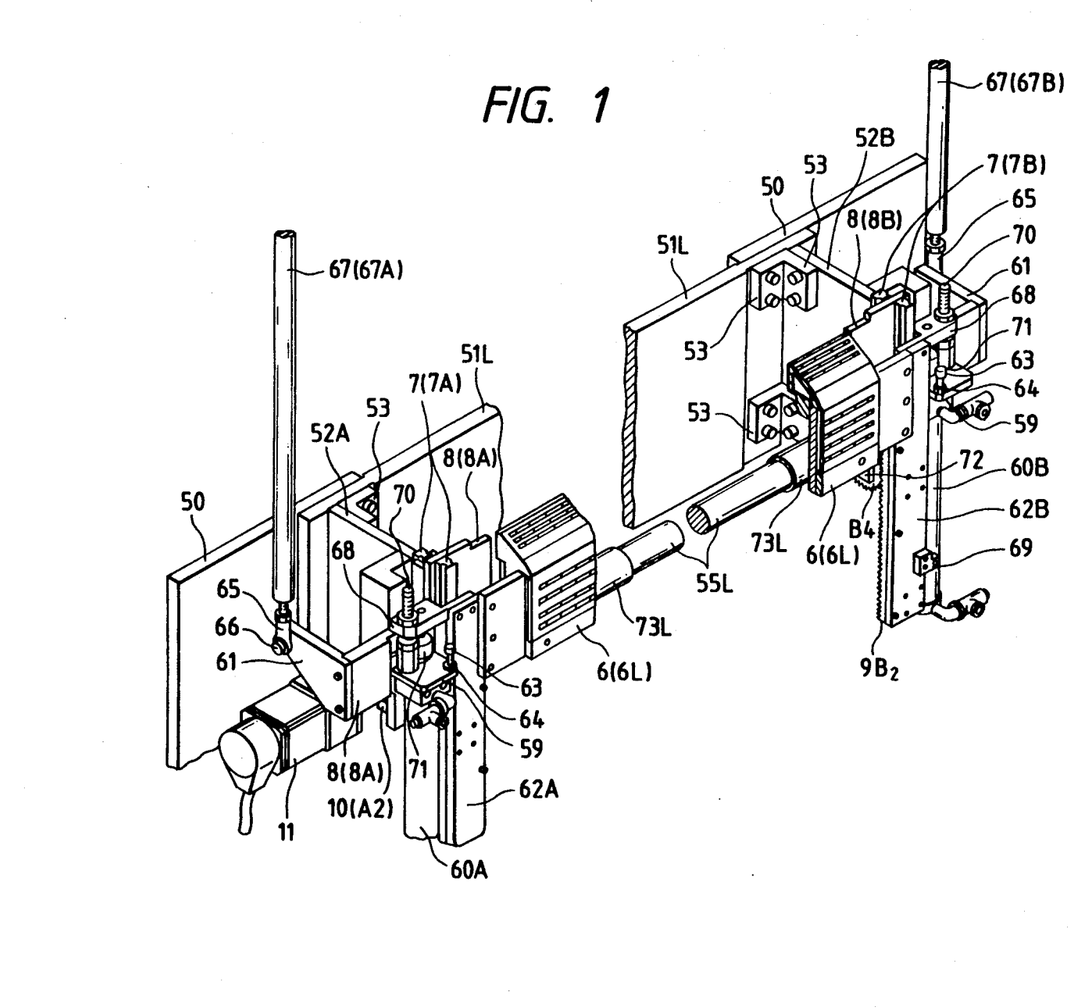
FIG. 1 is a perspective view of a lower film feed member section of an applying apparatus which is an embodiment of the present invention and by which stratified films, each consisting of a photosensitive resin layer and a light-transmissible resin film are applied, under heat and pressure, to the top and bottom of a base plate for a printed circuit board.
Figure 2:
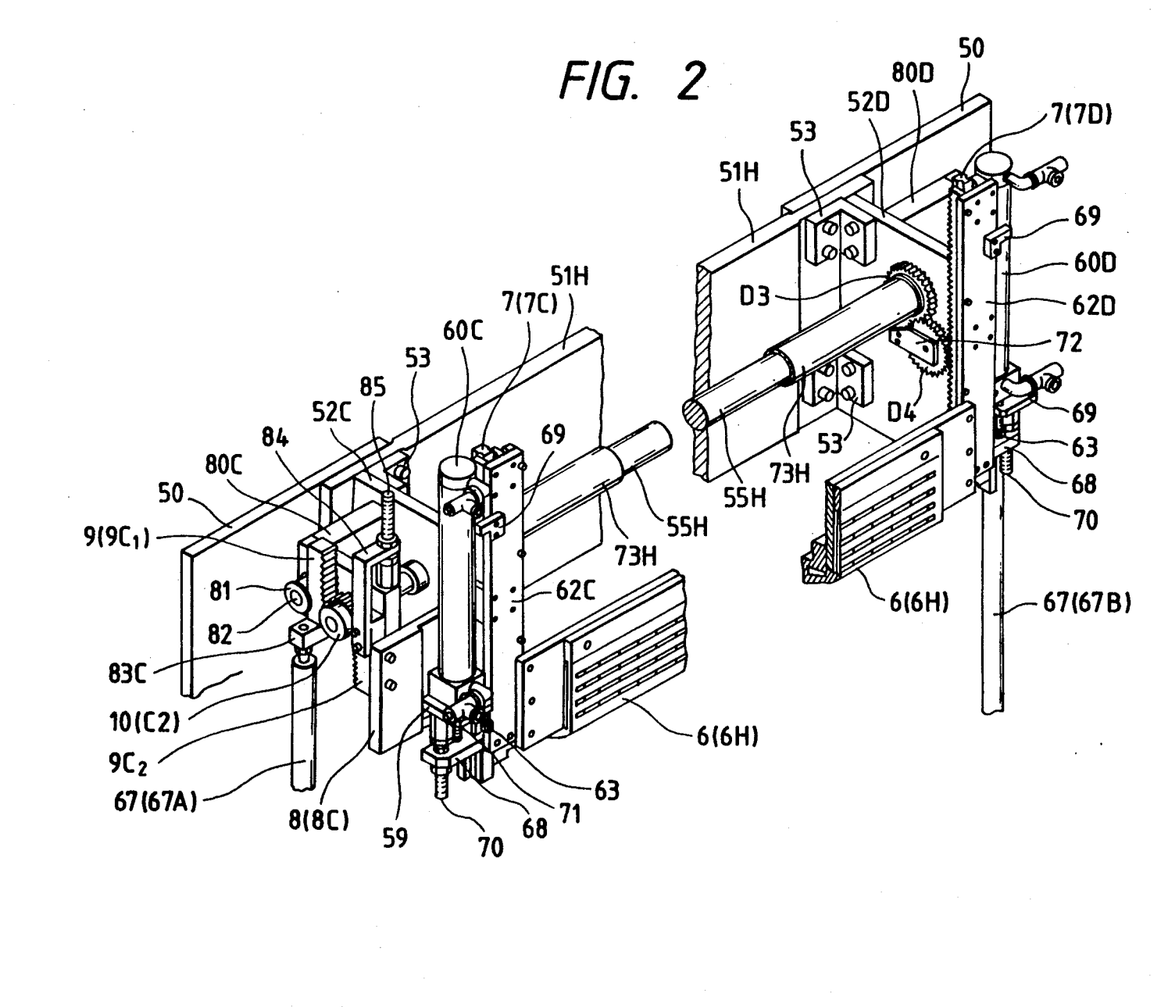
FIG. 2 is a perspective view of an upper film feed member section of the applying apparatus.

Rack 9C₁ secured to the coupling rod attaching plate 83C is moved upwardly while being guided by the support roller 81, so that the support plate drive gear C2 engaged with rack 9C₁ is rotated clockwise (with regard to being viewed from the left side of the applying apparatus shown in FIG. 2). The support plate coupling rod 55H having the support plate drive gear C2 secured thereto also is rotated clockwise (also with regard to being viewed from the left side of the apparatus shown in FIG. 2). Rack 9C₂ engaged with the support plate drive gear C2 is moved downwardly.

Since the rack 9C₂ is secured to the support plate 8C, the support plate 8C is moved downwardly so as to approach the base plate conveyance passage I-I. Coupling rod attaching plate 83D is moved up synchronously with the support plate 8B, because the support plate coupling rod 67B is secured at one end (by the rod end member 65) to the coupling rod attaching member 61 by bolt 66, and is secured at a second end thereof to the coupling rod attaching plate 83D. Rack 9D₁, secured to the coupling rod attaching plate 83D, is moved up while being guided by the support roller 81, so that the support plate drive gear D2 engaged with the rack 9D₁ is rotated counterclockwise (with regard to being viewed from the right side of the apparatus shown in FIG. 2). The support plate coupling rod 55H having the support plate drive gear secured thereto also is rotated counterclockwise (with regard to being viewed from the right side of the apparatus shown in FIG. 2). Rack 9D₂ engaged with the gear D2 is moved downwardly.

Since the rack 9D₂ is secured to the support plate 8D, the support plate is moved downwardly so as to approach the base plate conveyance passage I-I.

Thus, the support plate 8A-8D for the lower and upper main vacuum suction plates 6L and 6H are all moved synchronously together by the motive power of the drive motor 11.

The movement speed of the support plate 8A-8D is preset to be equal to that of the applying of the films 1B by rollers 21. The pulling-out speed of the continuous stratified films 1B to be applied to the base plate 22 is equal to that of the movement of the support plates.

Until the counter of the main vacuum suction plate suction counter becomes a prescribed value, the upper and lower main vacuum suction plates 6H and 6L holding the films 1B thereon by suction are moved so as to approach the base plate conveyance passage I-I. The prescribed value is larger than that for the count of the support plate movement counter.

The prescribed count value of the film cut-off position counter is larger than that for the count of the main vacuum suction plate suction counter. When the count of the film cut-off position counter has become the prescribed value, upper and lower rotary cutters 17, shown in FIG. 3, cut off the continuous stratified films 1B to a length corresponding to that of the base plate 22. Until the cut-off of films 1B is completed, the upper and lower main vacuum suction plates 6H and 6L holding the films thereon are moved so as to approach the base plate conveyance passage I-I. The halting positions of the support plates 8A-8D are determined by the positions in which the above-mentioned limit switches and the shock absorbers 85 contact the coupling rod support members 80C and 80D. The halting positions also are the same as the start positions of the support plates 8A-8D.

These operations are repeated so that the films 1B are applied to each of the base plates conveyed sequentially.

As evident from the above description, the above-described embodiment of the applying apparatus according to the invention produces the following effects:

1) Since a film feed member moving means is provided so that the main vacuum suction plates 6H and 6L (provided as film feed members above and below the base plate conveyance passage so as to feed the films 1B to the base plate 22) are moved upwardly and downwardly synchronously together at the right and left ends of the suction plates 6H, 6L by the moving means relative to the base plate 22, and the right and left support plates 8 for the suction plates are moved upwardly and downwardly synchronously together, air bubbles being generated between the film and the base plate and the wrinkling or the like of the film are unlikely even if the film has a large width.

2) Since the upper and lower main vacuum suction plates 6 are slidably supported at the right and left ends thereof by the body 50 of the applying apparatus, the plates can be stably slid.

3) The film feed member moving means includes synchronous kinematic coupling means, provided at the right and left ends of the upper and lower main vacuum suction plates 6, for moving the suction plates synchronously together, double rotary shaft torque transmission mechanisms, including the support plate coupling rods 55H and 55L and the main vacuum suction plate coupling pipes 73H and 73L, connected to the coupling means, and a single motive power source (drive motor 11) provided at a predetermined single rotary shaft (coupling rod 55L) of one of the double rotary shaft torque transmission mechanisms. Thus, the upper and lower main vacuum suction plates 6 can be moved upwardly and downwardly correctly synchronously together so that films 1B are unlikely to wrinkle or the like during their application to the base plate.

4) The inner rotary shaft of one of the double rotary shaft torque transmission mechanisms (the main vacuum suction plate coupling pipe 55H) is coupled to the support plates 8C and 8D for the upper main vacuum suction plate 6H by gear means. An inner rotary shaft of the second double rotary shaft torque transmission mechanisms (the other main vacuum suction plate coupling pipe 55L) is coupled to the support plates 8A and 8B for the lower main vacuum suction plate 6L by gear means. The rotary shaft of the drive motor 11 is coupled to the inner rotary shaft of the second double rotary shaft torque transmission mechanisms (pipe 73L). The upper and lower main vacuum suction plates 6 and the motive power source therefor are each coupled to the outer rotary shaft 55L of the second one of the double rotary shaft torque transmission mechanisms (pipe 73L) by gear means. Hence, the constitution of a vertical movement synchronization mechanism for the upper and lower main vacuum suction plates 6 is simplified.

According to the present invention, a film feed member moving means is provided so that upper and lower film feed members, provided above and below a base plate conveyance passage so as to feed continuous films to a base plate, are moved upwardly and downwardly synchronously together at the right and left ends of the feed members by the moving means relative to the base plate. Furthermore, right and left support plates for the film feed members are moved upwardly and downwardly synchronously together. Hence, the films are unlikely to wrinkle or the like during the heat and pressure application of the films to the base plate, even a film having a large width is applied.

The inner rotary shaft of a double rotary shaft torque transmission mechanism is coupled to the support plates for the upper film feed member by gear means. The inner rotary shaft of a second double rotary shaft means is coupled to the support plates for the lower film feed member by gear means. The rotary shaft of a drive motor is coupled to the inner rotary shaft of the second double rotary shaft torque transmission mechanism. The upper and lower film feed members and the drive motor therefor are coupled to the outer rotary shaft of the second double rotary shaft torque transmission mechanism by gear means. Hence, the constitution of the vertical movement synchronization mechanism for the upper and lower film feed members is simplified.

While a preferred embodiment of this invention has been described above, it will be obvious to those skilled in the art that various changes and modifications may be made therein without departing from the invention, and that thus the appended claims are intended to cover all such changes and modifications which fall within the true spirit and scope of the invention.

What is claimed is:

1. An applying apparatus which cuts off a portion of a plurality of continuous films to a prescribed length and applies the cut-off portions of said continuous films to a base plate being conveyed, said apparatus comprising:
    means for feeding said continuous films to said base plate, said film feed means comprising upper and lower film feed members provided above and below a base plate conveyance passage; and
    means for moving said upper and lower film feed members upwardly and downwardly synchronously together at first and second ends of said upper and lower film feed members relative to said base plate, said film feed means moving means comprising synchronous kinematic coupling means, provided at said first and second ends of said upper and lower film feed members, for moving said film feed means upwardly and downwardly synchronously together, said film feed means further comprising:
    a plurality of double-shaft torque transmission mechanisms being connected to said coupling means by gear means, at least one of said double-shaft torque transmission mechanisms having an inner rotary shaft; and
    a power source being provided at said inner rotary shaft of said at least one of said plurality of double-shaft torque transmission mechanisms.

2. An applying apparatus according to claim 1, further comprising a body, and wherein said upper and lower film feed members are slidably supported at said first and second ends thereof by said body of said applying apparatus.

3. An applying apparatus according to claim 2, wherein said synchronous kinematic coupling means comprise coupling members having first and second ends, and wherein said apparatus further comprises:
    first support plates being secured to said coupling members of said synchronous kinematic coupling means at said first end of each of said coupling members, said first support plates being provided for said lower film feed members; and
    second support plates being connected to said coupling members at said second end of each of said coupling members by racks and gears, said second support plates being for said upper film feed members.

4. An applying apparatus according to claim 1, said apparatus further comprising a drive motor having a rotary shaft;
    wherein said double-shaft torque mechanisms comprise first and second double rotary shaft means, each having an inner and an outer rotary shaft, and wherein said inner rotary shaft of said first double rotary shaft means is coupled to said first support plates by gear means, and said inner rotary shaft of said second double rotary shaft means being coupled to said second support plates by gear means, and
    wherein said rotary shaft of said drive motor is coupled to said inner rotary shaft of said second double rotary shaft.

5. An applying apparatus according to claim 2, said apparatus further comprising a drive motor having a rotary shaft;
    wherein said double-shaft torque mechanisms comprise a first and second double rotary shaft means, each having an inner and an outer rotary shaft, and wherein said inner rotary shaft of said first double rotary shaft means is coupled to said first support plates by gear means, and said inner rotary shaft of said second double rotary shaft means being coupled to said second support plates by gear means, and
    wherein said rotary shaft of said drive motor is coupled to said inner rotary shaft of said second double rotary shaft.

6. An applying apparatus according to claim 4, wherein said upper and lower film feed members and said power source for said upper and lower film feed members are coupled to said outer rotary shafts of said first and second double rotary shaft means by gear means.

7. An applying apparatus according to claim 5, wherein said upper and lower film feed members and said power source for said upper and lower film feed members are coupled to said outer rotary shafts of said first and second double rotary shaft means by gear means.

8. An applying apparatus comprising:
    a body;

upper and lower film feed members connected to said body, and being provided with racks at first and second ends;

support plates being coupled to and provided for said upper and lower film feed members, said support means being slidably movable and having racks mounted at first and second ends of said support plates;

straight movement guide means for guiding movement of said support plates, said support plates being coupled to said body of said apparatus by said straight movement guide means, and said film feed members being coupled to said support plates by said straight movement guide means;

first and second synchronization shafts having first and second gears mounted thereon at first and second ends of each of said first and second synchronization shafts, said first and second gears being engageable with said racks mounted on said support plates;

third and fourth synchronization shafts having racks mounted thereon, said racks being engageable with said first and second gears mounted on said first and second synchronization shafts, said third and fourth synchronization shafts being disposed so that movements of said support plates for said upper and lower film feed members are synchronized;

first and second synchronization hollow shafts in which said first and second synchronization shafts for said support plates are disposed;

third and fourth gears being mounted on said first and second synchronization hollow shafts and engageable with said racks mounted on said film feed members; and a drive motor having a rotary shaft, wherein said rotary shaft of said drive motor is coupled to said first and second synchronization shafts for said support plates.

* * * * *